July 3, 1956  H. E. TEMPLE  2,752,944
DIVERTING VALVE
Filed March 31, 1953
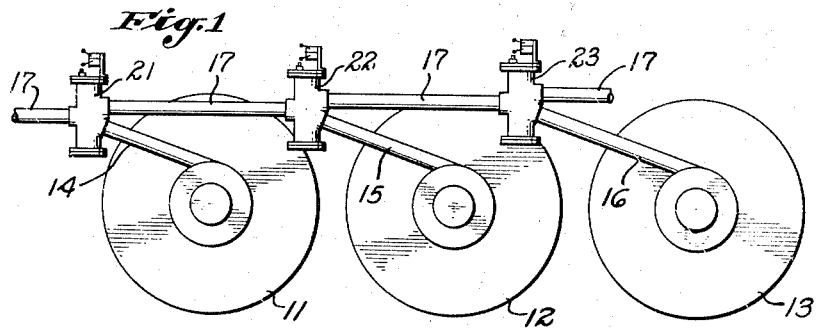
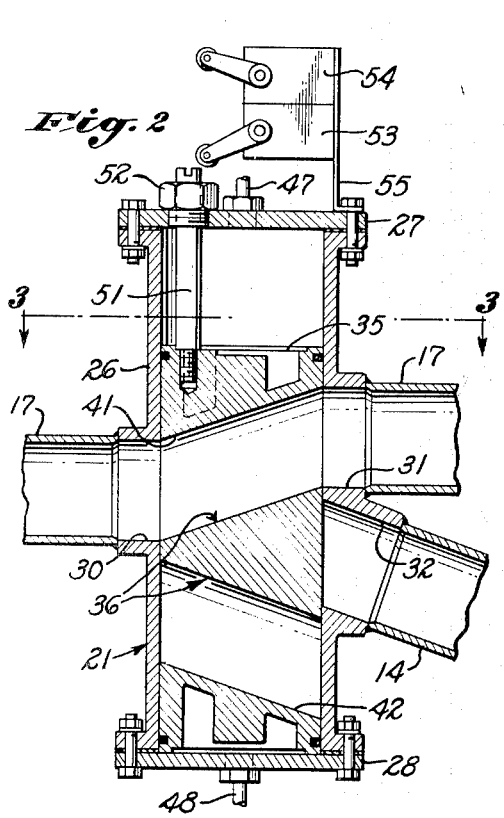
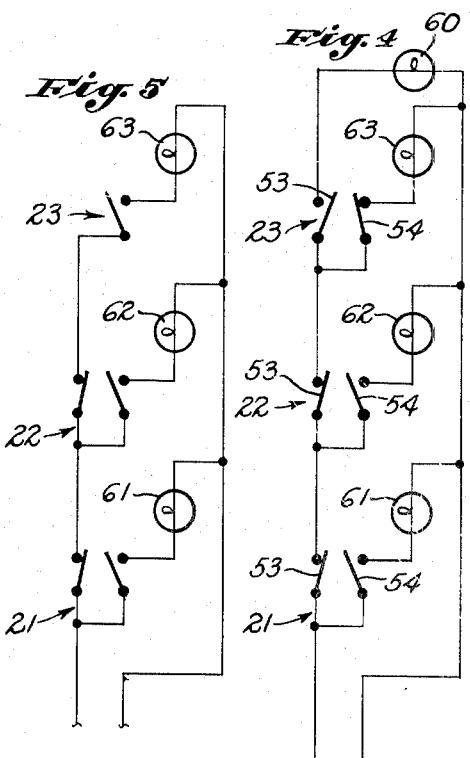
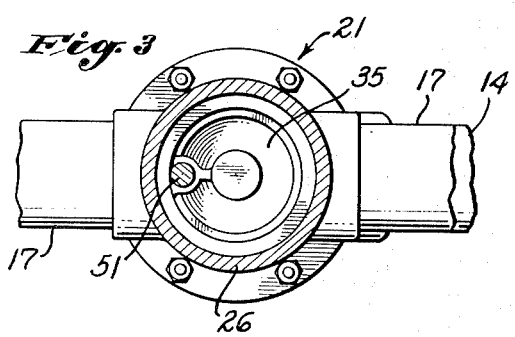
INVENTOR:
HIRAM E. TEMPLE
By
ATTORNEY United States Patent Office 2,752,944
Patented July 3, 1956

2,752,944

DIVERTING VALVE

Hiram E. Temple, San Gabriel, Calif., assignor to Read Standard Corporation, a corporation of Delaware Application March 31, 1953, Serial No. 345,879

4 Claims. (Cl. 137—554)

The present invention relates in general to selector or diverting valves for distributing materials and, more particularly, to position indicating systems for such valves. While the present invention may be incorporated in other systems, it will be considered herein in connection with a flour distributing system for use in flour mills or bakeries as a matter of convenience, it being understood that the invention is susceptible of other applications as well.

Flour is conventionally conveyed pneumatically by means of streams of air moving through suitable conduits leading to various desired points of storage or use. For example, the conduits through which the flour is conveyed pneumatically lead to storage bins, scale hoppers for weighing the flour into dough mixers, and the like, the general term "receptacles" being employed hereinafter to designate the structures or devices into which the flour is conveyed. Such a flour-conveying system requires selector or diverting valves for diverting the flour into one receptacle or another as desired, depending upon what is to be done with the flour, and a primary object of the invention is to provide an improved selector or diverting valve.

More particularly, an object of the invention is to provide a diverting valve which is movable through a range of two or more positions and which includes indicating means for indicating the position of the valve.

Another object is to provide a diverting valve which includes a valve body having an inlet and first and second outlets, which includes a valve member having passage means therein and movable in the valve body between a first position wherein the passage means connects the first outlet to the inlet and a second position wherein the passage means connects the second outlet to the inlet, and which includes indicating means actuable by the valve member for indicating the position thereof. Preferably, the valve body is a cylinder and the valve member is a piston reciprocable in the cylinder, the inlet and outlets being located between the ends of the cylinder and the passage means comprising two passages through the piston which are adapted to connect the first outlet to the inlet and the second outlet to the inlet, respectively, depending upon whether the piston is in a first position thereof, or in a second position thereof.

Another object is to provide an indicating means which includes switch means located externally of the cylinder and engageable by an actuating element on the piston which projects from the cylinder. Another object in this connection is to provide an actuating element having the form of a pin connected to one end of the piston and extending through the corresponding end wall of the cylinder into engagement with the switch means, the pin being offset laterally from the axis of the cylinder to prevent rotation of the piston about the axis of the cylinder, which is an important feature.

Another object is to provide a switch means which includes a first, normally closed switch adapted to be opened by the actuating pin and which includes a second, normally open switch adapted to be closed by the actuating pin, the actuating pin being disengaged from the first switch when the piston is in its first position and being in engagement with the second switch when the piston is in its second position. Thus, when the piston is in its first position, the first switch is closed and the second switch is open and, when the piston is in its second position, the first switch is open and the second switch is closed. For any intermediate position of the piston, both switches are open to indicate that the piston is in some improper position between its first and second positions, as will be discussed in more detail hereinafter.

Another object is to provide a diverting valve system which includes two or more such diverting valves, the first switches of the various diverting valves being connected in series and the second switches of the various diverting valves being connected in parallel with each other and in parallel with the respective first switches, there being an indicator in series with each second switch. Thus, if a particular piston is in its second position, the corresponding one of the indicators mentioned is energized to denote this fact, and, if none of the pistons is in its second position, none of the indicators mentioned is energized. Preferably, a master indicator is connected in series with the series-connected first switches so that, if all of the pistons are in their first positions, this master indicator is energized to denote this fact. With this construction, if one of the pistons is in an improper intermediate position, neither the master indicator nor any of the other indicators will be energized so that this state of affairs is immediately apparent to the operator of the system.

The foregoing features, objects and advantages of the present invention, together with various other features, objects and advantages thereof which will become apparent, may be attained with the exemplary embodiment of the invention which is illustrated in the accompanying drawing, and which is described in detail hereinafter. Referring to the drawing:

Fig. 1 is a fragmentary plan view illustrating at least a portion of a flour distributing system which incorporates the invention;

Fig. 2 is a longitudinal sectional view of a diverting valve of the invention;

Fig. 3 is a transverse sectional view taken along the arrowed line 3—3 of Fig. 2; and Figs. 4 and 5 are wiring diagrams illustrating two different ways of interconnecting two or more diverting valves of the invention.

Referring particularly to Fig. 1 of the drawing, the numerals 11, 12 and 13 respectively designate receptacles into which flour, or other material, is to be delivered selectively, these receptacles representing such structures or devices as storage bins, scale hoppers for weighing the flour into dough mixers, or the like. Leading to the respective receptacles 11, 12 and 13 are branch or diverting lines, 14, 15 and 16 which branch off from the through line 17. The latter conveys a stream of flour, or other material, discharged by any suitable device, such as the rotary valve disclosed in my copending application Serial No. 291,896, filed June 5, 1952. Selector or diverting valves 21, 22 and 23 are located at the respective junctions of the branch lines 14, 15 and 16 with the through line 17, each of these valves being adapted to direct the stream of flour along the through line 17, or into the corresponding branch line 14, 15 or 16 leading to the corresponding receptacle 11, 12 or 13. The valves 21, 22 and 23 are alike so that only the valve 21 will be considered in detail.

Referring to Figs. 2 and 3 of the drawing, the valve 21 includes a valve body having the form of a cylinder 26 the ends of which are closed by end walls 27 and 28. Intermediate the ends of the cylinder 26 are an inlet 30 and first and second outlets 31 and 32, sections of the through line 17 being connected to the inlet 30 and the outlet 31 and the branch line 14 being connected to the outlet 32. The inlet 30 on the one hand and the outlets 31 and 32 on the other are located on opposite sides of the cylinder 26 with the axis of the inlet 30 intermediate the outlets 31 and 32 to come as close as possible to linear flow through the valve 21, irrespective of whether the flow is from the inlet 30 to the outlet 31, or from the inlet 30 to the outlet 32.

Reciprocable in the cylinder 26 is a valve member having the form of a piston 35 having passage means 36 therein for connecting either the outlet 31 or the outlet 32 to the inlet 30. The passage means 36 comprises a first passage 41 which connects the first outlet 31 to the inlet 30 when the piston is in a first position in the cylinder 26, which is the position shown in Fig. 2 of the drawing. The passage means 36 also includes a second passage 42 which connects the second outlet 32 to the inlet 30 when the piston 35 is in a second position thereof. This second position of the piston 35 is not shown in the drawing, the piston being regarded as being in its second position when it is at the upper end of the cylinder 26, as viewed in Fig. 2, so that the passage 42 registers with the inlet 30 and the outlet 32.

The piston 35 is reciprocated in this cylinder 26 by air pressure in the particular construction illustrated, air lines 47 and 48 being connected to the end walls 27 and 28, respectively, of the cylinder and communicating with the upper and lower ends, respectively, of the cylinder as viewed in Fig. 2. As will be apparent, if air under pressure is admitted to the cylinder 26 through the air line 47, the piston 35 will assume its first position, and, if air is admitted to the cylinder through the air line 48, the piston will assume its second position. The air lines 47 and 48 may be connected to a suitable selector valve, not shown, which, in turn, is connected to a suitable source of compressed air.

Connected to one end of the piston 35 is an actuating element or pin 51, this pin projecting through a packing gland 52 in the end wall 27 to the exterior of the cylinder. The actuating pin 51 is offset laterally from the axis of the cylinder 26 so that it prevents rotation of the piston 35 about the axis of the cylinder, thereby preserving the alignments of the passages 41 and 42 with the inlet 30 and outlets 31 and 32, which is an important feature.

The actuating pin 51 is adapted to actuate elements of an indicating means or system for the valves 21, 22 and 23, as described in more detail hereinafter. More particularly, the actuating pin 51 of the valve 21 is adapted to actuate limit switches 53 and 54 located externally of the cylinder 26 and preferably mounted on a bracket 55 connected to the cylinder as illustrated. The switch 53 is normally closed and is disengaged by the actuating pin 51 when the piston 35 is in its first position, the switch 53 being closed under such conditions. As soon as the piston 35 moves toward its second position a short distance, the actuating pin 51 engages the switch 53 to open it. The switch 54 is normally open and is adapted to be engaged by and closed by the actuating pin 51 when the piston 35 reaches its second position. Thus, when the piston 35 is in its first position, the switch 53 is closed and the switch 54 is open. For any intermediate position of the piston 35, both switches are open. Finally, when the piston 35 is in its second position, the switch 53 is open and the switch 54 is closed. Thus, different combinations of positions are occupied by the switches 53 and 54 depending upon whether the piston 35 is in its first position, its second position, or an improper intermediate position. Suitable indicators controlled by the switches 53 and 54 are energized to indicate the piston positions, as will now be described.

Referring now to Fig. 4 of the drawing, the switches 53 of the three valves 21, 22 and 23 illustrated are connected in series with respect to each other and with respect to a master indicator 60. The switches 54 are connected in parallel with respect to each other and with respect to the corresponding switches 53. Indicators 61, 62 and 63 are connected in series with the respective switches 54 of the valves 21, 22 and 23. The indicators 60 to 63 are shown as electric lamps, but various other indicators may be substituted therefor.

Considering the operation of the invention as illustrated in Figs. 1 to 4 of the drawing, it will be assumed that the pistons 35 of the valves 21, 22 and 23 are all in their first positions so that no flour is being diverted to any of the receptacles 11, 12 and 13. In other words, the flour is flowing along the through line 17. Under such conditions, all of the switches 53 are closed and the master indicator 60 is energized to denote this situation.

However, if the piston 35 of one of the valves 21, 22 and 23 is in its second position to divert flour into the corresponding receptacle 11, 12 or 13, the corresponding switch 53 is open to deenergize the master indicator 60 and the corresponding switch 54 is closed to energize the corresponding indicator 61, 62 or 63. In the particular example illustrated in Fig. 4, flour is being diverted into the receptacle 13 so that the switch 53 is open and the switch 54 is closed. Under such conditions, the master indicator 60 is de-energized to indicate that flour is being diverted to one of the receptacles 11, 12 or 13 and the indicator 63 is energized to indicate that the receptacle to which flour is being diverted is the receptacle 13.

In the event that one of the pistons 35 sticks in an improper intermediate position for any reason, which may result in a split of flour flow, both of the corresponding switches 53 and 54 will be open so that none of the indicators 60 to 63 are energized. Thus, when none of the indicators are energized, a piston in an improper intermediate position is indicated, which is an important feature.

The circuit of Fig. 5 is similar to that of Fig. 4, differing only in the omission of the master indicator 60 and the omission of the switch 53 of the last valve in the series. Except for the functions omitted by the omission of these elements, the operation of the circuit of Fig. 5 is the same as that of Fig. 4.

In addition to the circuitry described, various other electrical elements may be added. For example, the switches 53 and 54 of the various valves 21 to 23 could be connected in circuit with selector switches, not shown, determining the positions of the pistons of the valves 21 to 23, and in circuit with means for energizing a device, such as the rotary valve mentioned, for flowing flour through the line 17. With such a circuit, the flour delivering or propelling device could not be energized unless the pistons of all of the valves 21, 22 and 23 were in the selected positions, thereby preventing split flow at any particular valve.

Although I have disclosed exemplary embodiments of my invention herein, it will be understood that various changes, modifications and substitutions may be incorporated in such embodiments without departing from the spirit of the invention as defined in the claims which follow.

I claim as my invention:

1. In a diverting valve system, the combination: at least two diverting valves each of which includes a valve body having an inlet and first and second outlets, and a valve member having passage means therein and movable in its respective valve body between a first position wherein said passage means connects said inlet to said first outlet and a second position wherein said passage means connects said inlet to said second outlet; indicating means including switch means for indicating the positions of said valve members; each of said valve members being provided with an actuating element engageable with said switch means to actuate same; said switch means including first, normally closed switches adapted to be opened by said actuating elements and which are disengaged by said actuating elements when said valve members are in said first positions, and including second, normally open switches adapted to be closed by said actuating elements and which are engaged by said actuating elements when said valve members are in said second positions, said first switches of said diverting valves being connected in series and said second switches of said diverting valves being connected in parallel with said first switches thereof, respectively; and indicators connected in series with said second switches, respectively.

2. In a diverting valve system, the combination of: at least two diverting valves each of which includes a cylinder having an inlet and first and second outlets intermediate the ends thereof, and a piston having passage means therein and reciprocable in its respective cylinder between a first position wherein said passage means connects said first outlet to said inlet and a second position wherein said passage means connects said second outlet to said inlet; a respective pin connected to one end of each of said pistons and extending through one end of each of said cylinders to prevent rotation of said pistons about the axes of their respective cylinders; indicating means externally of said cylinders and actuable by said pins for indicating the positions of said pistons in said cylinders, said indicating means including first, normally closed switches adapted to be opened by said pins and which are disengaged by said pins when said pistons are in said first positions, and including second, normally open switches adapted to be closed by said pins and which are engaged by said pins when said pistons are in said second positions, said first switches of said diverting valves being connected in series and said second switches of said diverting valves being connected in parallel with said first switches thereof, respectively; and indicators connected in series with said second switches, respectively.

3. In a diverting valve system, the combination of: at least two diverting valves each of which includes a two-position selector valve; first, normally closed switches and second, normally open switches for said diverting valves; means operable in response to movement of said selector valves from a first position to a second position for opening said first switches and closing said second switches, said means opening said second switches and closing said first switches in response to movement of said selector valves from second position back to first position, said first switches of said diverting valves being connected in series and said second switches of said diverting valves being connected in parallel with said first switches thereof, respectively; and indicators connected in series with said second switches, respectively.

4. A diverting valve system as in claim 3 including another indicator in series with said first switches.

References Cited in the file of this patent
UNITED STATES PATENTS

| | | |
|---|---|---|
| 522,995 | Maxim | July 17, 1894 |
| 1,808,911 | Watson | June 9, 1931 |
| 1,925,531 | Grunsky | Sept. 5, 1933 |
| 2,371,188 | Russell | Mar. 13, 1945 |

FOREIGN PATENTS

| | | |
|---|---|---|
| 570,125 | France | Jan. 12, 1924 |